United States Patent
Kurihara et al.

(10) Patent No.: US 7,077,986 B2
(45) Date of Patent: Jul. 18, 2006

(54) METHOD FOR FORMATION OF POLYMER

(75) Inventors: Fumio Kurihara, Tokyo (JP); Junji Koujina, Tokyo (JP); Akihiko Morikawa, Tokyo (JP); Akio Aoyama, Tokyo (JP); Masaki Maeda, Tokyo (JP)

(73) Assignee: JSR Corporation, Tokyo (JP)

( * ) Notice: Subject to any disclaimer, the term of this patent is extended or adjusted under 35 U.S.C. 154(b) by 278 days.

(21) Appl. No.: 10/381,439

(22) PCT Filed: Sep. 27, 2001

(86) PCT No.: PCT/JP01/08471

§ 371 (c)(1),
(2), (4) Date: Mar. 31, 2003

(87) PCT Pub. No.: WO02/28612

PCT Pub. Date: Apr. 11, 2002

(65) Prior Publication Data

US 2003/0168767 A1 Sep. 11, 2003

(30) Foreign Application Priority Data

Sep. 29, 2000 (JP) .......................... 2000-301001
Feb. 15, 2001 (JP) .......................... 2001-38829

(51) Int. Cl.
*B29C 44/02* (2006.01)
*B29C 44/06* (2006.01)
(52) U.S. Cl. ....................... 264/45.5; 264/51
(58) Field of Classification Search ............... 264/46.4, 264/51, 572, 45.5
See application file for complete search history.

(56) References Cited

U.S. PATENT DOCUMENTS

| | | | | |
|---|---|---|---|---|
| 4,285,901 A | * | 8/1981 | Yotsutsuji et al. | 264/225 |
| 5,093,053 A | * | 3/1992 | Eckardt et al. | 264/45.1 |
| 5,173,241 A | * | 12/1992 | Shibuya et al. | 264/572 |
| 5,246,646 A | * | 9/1993 | Baxi | 264/40.3 |
| 5,660,771 A | * | 8/1997 | Dunfee et al. | 264/46.4 |
| 5,667,738 A | * | 9/1997 | Krajcir | 264/45.5 |
| 6,375,878 B1 | * | 4/2002 | Gray et al. | 264/46.5 |
| 6,491,860 B1 | * | 12/2002 | Hendry | 264/572 |
| 6,569,365 B1 | * | 5/2003 | Mizuno et al. | 264/45.5 |

FOREIGN PATENT DOCUMENTS

| | | |
|---|---|---|
| JP | 61-239917 | 10/1996 |
| JP | 10-211630 | 8/1998 |
| JP | 2000-025046 | 1/2000 |
| JP | 2000-033635 | 2/2000 |
| JP | 2000-094468 | 4/2000 |

* cited by examiner

*Primary Examiner*—Allan R. Kuhns
(74) *Attorney, Agent, or Firm*—Oblon, Spivak, McClelland, Maier & Neustadt, P.C.

(57) ABSTRACT

Objects of the present invention are to provide a method for molding polymers to be able to mold products each of which has an outer shape transferred accurately from the shape of the inside of a mold, exhibits high dimensional accuracy and is uniform in the thickness of its surface skin layer and the expansion ratio in its foamed inside.

A molten polymer 60 is injected into a cavity 30 and simultaneously gas is pressed to the inside of the molten polymer 60 to contact the polymer close to the surface of the mold, and then gas is exhausted while maintaining the shape inside the mold, to thereby mold a polymer formed product in which a surface skin layer 61 and a foamed inside 62 having cushioning property are formed in one piece.

6 Claims, 8 Drawing Sheets

(a)

(b)

(a)

(b)

METHOD FOR FORMATION OF POLYMER

FIELD OF THE INVENTION

The present invention relates to methods for molding polymers, and more particularly to methods for molding a product in which a skin layer and a cushiony inside are formed in one piece by using the same polymers, whereas the term "polymers" refers to "thermoplastic resins," "thermoplastic elastomers," "thermosetting resins" or "crosslinked elastomers."

RELATED ART

Molded products, each having a skin layer and a cushiony inside, are used for various purposes, such as automotive interior panels to meet the requirements of posh appearance and softness of touch.

The molded products, each of which a skin layer and a cushiony inside are formed in one piece, can be molded by covering a cushiony material, such as polyurethane foam, with vinyl chloride or the like.

Recently, in response to requirements of high recycling efficiency and efficient cost reduction by simplifying processes, molded products, each having a skin layer and a cushiony inside and molded using the same material in one piece, have been provided.

There have been disclosed techniques for molding a product having a skin layer and a cushiony inside formed in one piece by using the same material in, for example, the Japanese Patent Publications Laid-Open Nos. 7-80885 and 7-88878.

The Japanese Patent Publication Laid-Open No. 7-80885 describes a technique for obtaining a molded product with a desired expansion ratio and an adequate mold surface transferability in reference to an injection molding method for obtaining a molded product having a skin layer containing a foam part by injecting a resin containing a foaming agent into a cavity within a mold clamped in an openable way and operating the mold to have said mold cavity enlarged and the resin foamed, so that the skin layer is cooled and solidified when it contacts with the inside surface of the mold. The desired expansion ratio and the adequate mold surface transferability of the 7-80885 are obtained by enlarging the mold cavity at a suitable speed and selecting a suitable resin, etc.

The Japanese Patent Publication Laid-Open No. 7-88878 describes a technique for obtaining a molded product with desired feel by controlling the operating speed for enlarging a mold cavity according to the pressure within a mold in reference to an injection molding method similar to the injection molding method described in the Japanese Patent Publication Laid-Open No. 7-80885.

DISCLOSURE OF THE INVENTION

According to the techniques described in the Japanese Patent Publications Laid-Open Nos.7-80885 and 7-88878, a molten resin containing a foaming agent is injected into a cavity within a mold and then the mold is operated in such a way that the mold cavity full of said molten resin is enlarged and thereby the resin is foamed. For example, as illustrated in the upper and lower schematics of FIG. 5, when a lower mold 120 is displaced leftward as viewed in this figure, the mold cavity full of a molten resin 160 is enlarged and pressure within the mold is lowered, and an molded product having a skin layer 161 and an internal foaming part 162 formed in one piece is obtained.

However, the techniques described in the Japanese Patent Publications Laid-Open Nos. 7-80885 and 7-88878 have problems as described below:

Firstly, as the molding space (i.e., mold cavity) is enlarged and deformed in the process of molding, it may be difficult to precisely transfer the inside shape of a mold cavity to the outside shape of a molded product, and thus dimensional precision may be lowered. Furthermore, in order to precisely transfer the inside shape of a mold cavity to the outside shape of a molded product, it is necessary to precisely control the enlargement of the molding space, and this will increase the cost.

Secondly, as the enlargement of the molding space is different from one portion to another, the thickness of the skin layer 161 and the expansion ratio of the foam part 162 vary from one position to another. As a result, the appearance, feel and the like of a molded product vary from one position to another. For example, for a molded product with cross-sectional shape as illustrated in FIG. 5, while the thickness of the vertical portion as viewed in this figure is changed from T0 to T1 when the molding space is enlarged, the thickness of the upper and lower horizontal portions remains unchanged at t0. This inevitably causes scattering to the appearance and feel of the molded product between the vertical portion and the upper and lower horizontal portions.

Thirdly, due to the shape of products to be molded, there are some restrictions on structuring molds about the direction in which the molding space is to be enlarged. For this reason, however well the mold structure is contrived, the second problem described above may not be solved completely.

The primary object of the present invention is to solve these three problems described above.

It has been demanded that a molded product having a skin layer and a cushiony inside both molded with the same material should be provided with desired posh appearance by improving the transferability to such an extent that the mirror finished surface and/or embossed surface can be completely transferred.

The secondary object of the present invention is to satisfy this demand.

The primary object of the present invention can be achieved by constructions as described below in which pressure on a molten resin within a mold cavity without deforming the mold cavity and thereby the inside of the molten resin within the mold cavity is foamed.

The present invention relates to a method for molding polymers in which a molten polymer containing a foaming agent is put into a mold cavity and contacted in the molten state close to the mold cavity surface, and then the volume occupied by said polymer is increased while the inside shape of the mold cavity is maintained to obtain a molded product having the outside shape thereof fit to the inside shape of the mold cavity and the inside thereof foamed.

According to the present invention, as the mold cavity remains unchanged, the dimensional precision of a molded product is high. Furthermore, the thickness of a skin layer and the expansion ratio of a foam part are uniform, and there is no differences in appearance and feel from one portion to another.

A method for putting a polymer containing a foaming agent into a mold cavity may be realized in a method in which a polymer in the molten state is put into a mold cavity as seen in injection molding methods, and also a method in which a polymer is put into a mold cavity and then heated and molten as seen in compression molding methods.

Said volume occupied by a polymer refers to a volume occupied by a polymer injected by one shot into a mold cavity by an injection molding method or a volume occupied by a polymer put in a mold cavity by a compression molding method.

As a specific example of methods for increasing said volume occupied by a polymer while the inside shape of a mold cavity is maintained, in addition to methods described below, there is a method in which a pin positioned within a molten polymer is pulled out with specified timing.

Here, it should be noted that the skin layer of a molded product with the outside shape thereof fit to the inside shape of a mold cavity and with the inside made foamed is formed as a non-foamed skin.

The present invention relates to a method for molding polymers in which a polymer containing a foaming agent is put into a mold cavity, gas is injected into said polymer to contact the polymer in the molten state close to the mold cavity surface by utilizing the pressure of said gas, and said gas is exhausted to fill the space occupied until then by said gas with the polymer and thereby increase the volume occupied by said polymer and foam said polymer to obtain a molded product having the outside shape thereof fit to the inside shape of the mold cavity and the inside thereof foamed.

According to the present invention, as the volume occupied by the molten polymer is increased by the exhausting gas, the pressure when the gas is exhausted can be easily adjusted as well as the dimensional precision of molded products is high and there is no differences in appearance and feel from one portion to another. Therefore, an effect that the thickness of a skin layer and the expansion ratio of a foam part can be easily adjusted to desired thickness and expansion ratio respectively can be obtained.

The present invention can be embodied as a molding method in, for example, a gas-assisted injection molding method by exhausting the gas after the skin layer contacted close to a mold cavity surface is cooled and solidified and filling the space occupied until then by said gas with the polymer and then foaming said polymer. Here, the gas-assisted injection molding method refers to an injection molding method in which high-pressure gas is injected into a molten resin at the same time when said molten resin is injected into a mold. This method can improve the adherability of the molten resin to a mold face and also improve the fluidity of said molten resin to quickly go around all over the mold face. When the gas-assisted injection molding method is applied, a hollow and light-weighted molded product with no flection and with high transferability can be obtained.

When exhausting the gas, it is preferable that such exhausting should be controlled so that the pressure within the mold cavity can be maintained to such a level that the skin layer cannot come off from the mold face and the inside of the molded product can be foamed at a desired expansion ratio.

According to the present invention, a molded product having desired appearance and desired cushion performance can be obtained by performing comparatively easy control, i.e., adjusting the pressure of the exhaust gas so that the pressure within the mold cavity can be lowered on a desired pattern. Here, the desired pattern refers to, for example, a pattern in which the pressure within the mold cavity is comparatively quickly lowered in the early stage when the foaming power is strong and the pressure is slowly lowered in the last stage when the foaming power is weak.

The present invention relates to a method for molding polymers in which a polymer containing a foaming agent is put into a mold cavity, then said polymer is contacted in the molten state close to a mold cavity surface, and then a part of said polymer is released in the molten state into a shelter communicated with said mold cavity, and thereby the volume occupied by said polymer in the molten state is increased to obtain a molded product having the outside shape fit to the inside shape of the mold cavity and the inside thereof made foamed.

According to the present invention, as the volume occupied by the molten polymer can be increased by releasing a part of the polymer into the shelter, the extent of lowering the pressure can be set by setting the size of the shelter accordingly, as well as the dimensional precision of molded products is high and there is no differences in appearance and feel from one portion to another. Therefore, an effect that the expansion ratio of a foam part can be easily adjusted to a desired scale can be obtained.

The present invention can be embodied as a molding method in which, for example, a shelter and a mold cavity are communicated with each other, the communication of said shelter and mold cavity is maintained shut off by a shutter until a polymer containing a foaming agent is contacted in the molten state close to a mold cavity surface and a skin layer is cooled and solidified, and said shutter is opened to make both the shelter and the mold cavity communicated with each other with timing in which the skin layer is formed.

The present invention may also be embodied as a molding method in which a shelter and a mold cavity are always maintained in communication with each other by means of a comparatively thin passage, and a process in which a polymer containing a foaming agent is contacted in the molten state close to a mold cavity surface and a skin layer is cooled and solidified and a process in which a part of the molten polymer is released into the shelter and thereby the volume occupied by said polymer is increased are carried out at the same time in parallel. When said molding method is practiced in an injection molding method, it is preferable that the speed of the injected polymer spreading all over the mold surface should be properly adjusted to make the skin layer quickly formed. This adjustment of the speed maybe performed, for example, by adjusting the temperature of the mold surface etc.

The secondary object of the present invention can be achieved by constructions as described below in which the pressure on a molten resin within a mold cavity is lowered without deforming the mold cavity and thereby the inside of the molten resin within said mold cavity is foamed, and furthermore the temperature of the mold surface is maintained to a certain temperature level or higher until the molten polymer is completely contacted closeto the mold cavity surface.

The present invention is related to a method for molding polymers in which the entirety or a part of said mold surface is heat insulated in any of the inventions described above.

According to the present invention, as the mold surface is heat insulated, an effect that the molten polymer can be completely contacted close to the mold cavity surface and thereby the mirror finished surface and/or embossed surface can be completely transferred, as well as an effect that the dimensional precision is high and there is no differences in appearance and feel from one portion to another, can be achieved.

The heat insulation of the mold surface can be achieved by providing a heat-insulating layer on the skin layer of the mold surface or in the neighborhood of the mold surface that is not so deep from the skin layer of the mold surface. When a heat-insulating layer is provided on the skin layer of the mold surface or in the neighborhood of the mold surface that is not so deep from the skin layer of the mold surface, as the mold surface can be heated by utilizing the heat of the molten polymer, said polymer can be completely contacted close to the mold cavity surface. Therefore, the mirror surface and/or embossed surface can be completely transferred. When an injection molding method is used, since the development of a skin layer can be controlled for a comparatively longer time, the fluidity of the molten polymer can be maintained for a comparatively longer time, even a thin molded product can be obtained in good condition. Here, the skin layer refers to a skin layer solidified when it contacts the mold surface.

Said heat-insulating layer may be provided all over the mold surface and also may be provided only on a part of the mold surface which should have a high transferability.

For example, in a double injection in which an already molded product is set within a mold cavity and additional injection is made, the heat-insulating layer may be provided only on the mold surface that is not covered with said product. In this arrangement, an injected good molded product with no flection between the already molded product and the newly injected polymer can be obtained.

When said heat-insulating layer is provided all over the mold surface, a working effect that the molten state of said polymer can be maintained until the polymer is completely contacted close to the mold cavity surface and thereby the transferability can be improved can be adequately achieved.

When said heat-insulating layer is provided on the skin layer of the mold surface, the surface of said heat-insulating layer serves as a transfer surface. That is, the surface of said heat-insulating layer is transferred in such a way that the outside shape of the molded polymer product can be formed.

When said heat-insulating layer is formed in the neighborhood of the mold surface, the original mold surface serves as a transfer surface. Here, the neighborhood of the mold surface refers to the rear of the mold surface, i.e., the inside of the mold, and a depth allowing the complete heating of the mold surface with the heat from the molten polymer.

The thermal conductivity of said heat-insulating layer should preferably be within a range of 0.001 to 0.01 [cal/cm·s·° C.]. If this thermal conductivity is below 0.001 [cal/cm·s·° C.], cooling will require an impractically very long time. On the other hand, if said thermal conductivity is over 0.01 [cal/cm·s·° C.], the transfer surface will be cooled down before the molten polymer is completely contacted close to the transfer sursurface, so that the mold surface will not be completely transferred.

As examples of a heat insulating material whose heat conductivity is within a range of 0.001 to 0.01 [cal/cm·s·° C.], specific silane coating materials, epoxy resins, phenolic resins, fluorocarbon resins and ceramics can be named.

The specific silane coating materials includes the hydrolysate of organosilane expressed by a chemical formula of

$$R^1Si(OR^2)_3$$ [Chemical Formula 1]

and/or a coating material mainly composed of a partially condensed product thereof. Here, $R^1$ indicates the organic group with the carbon numbers 1 to 8, and $R^2$ indicates alkyl group with the carbon numbers 1 to 5 or acyl group with the carbon numbers 1 to 4.

The thickness of said heat insulating layer is 0.02 to 3 [mm] and preferably should be 0.1 to 2 [mm]. If this thickness is below 0.02 [mm], as the heat insulating layer will not have an adequate heat insulating effect, the temperature of the mold surface will not be adequately raised, and the mold surface will not be completely transferred. If said thickness is over 3 [mm], the heat insulating effect will be excessively large, the polymer cooling speed will be excessively low, cooling to the temperature at which the molded product can be taken out will require a long time, and therefore, this much thickness will not be applicable to industrial production.

The heat insurance of the mold surface can also be achieved by providing spaces at the back of the mold surface and increasing the adiathermancy and/or by composing the mold surface with a porous metal and lowering the heat conductivity.

Making the mold surface porous can be achieved by allocating a porous metal plate, apart from the main body of a mold, into the mold or making the mold surface porous. A porous metal plate can be manufactured by making holes within a range of 1 to 200 μm across each, preferably approx. 10 μm across each, by using laser, at a density within a range of 30,000 to 3,000,000 pcs/cm², preferably within a range of approx. 100,000 to 1,000,000 pcs/cm². If the hole diameter is larger than 200 μm, a molten resin will enter the holes not only to lower the mold releasability but also to degrade the surface condition of molded products, which is not preferable. If the hole diameter is smaller than 1 μm or the hole density is lower than 30,000 pcs/cm², a desired heat insulating effect will not be obtained, which is not preferable, either. If the hole density is larger than 3,000,000 pcs/cm², the mold durability will be degraded, which is not preferable, either.

In a structure in which a heat insulating layer is provided over the skin layer of the mold surface or in the neighborhood thereof, spaces are provided at the back of the mold surface, or the mold surface is made porous to heat insulate the mold surface, a means for secondarily heating the mold surface may be added. That is, if the heat from the molten polymer alone is not adequate enough to raise the temperature of the mold surface, the shortfall from the target temperature may be made up for by preheating the mold surface by using a secondary heating means.

The present invention relates to a method for molding polymers in which the entirety or part of the mold surface is preheated in either of the inventions described above.

According to the present invention, as the mold surface is preheated, an effect that the molten polymer can be completely contacted close to the mold cavity surface and thereby the mirror finished surface and/or embossed surface can be completely transferred, as well as an effect that the dimensional precision is high and there is no differences in appearance and feel from one portion to another, can be achieved.

The preheating of the mold surface can be achieved by, for example, raising the temperature of the mold surface by injecting heated air or heated nitrogen gas (hereinafter referred to as "temperature controlling gas") into the mold cavity forming a closed space, and then quickly exhausting said temperature controlling gas. Here, when the molding methods according to the present invention is performed in an injection molding method, the molten polymer is supposed to be injected into the mold cavity before or almost simultaneously in parallel with the exhaust of the heated air.

The structure exemplified above needs a mechanism for injecting the temperature controlling gas into the mold cavity, a mechanism for quickly exhausting the temperature controlling gas from the mold cavity, and a mechanism for holding the temperature of the mold surface raised by the temperature controlling gas for a time required.

As a mechanism for injecting the temperature controlling gas, a mechanism, for example, similar to a mechanism used for injecting gas in the gas-assisted injection molding method may be used. However, as the temperature controlling gas is used only for raising the temperature of the mold surface by flowing within the mold cavity, the pressure required for injecting the temperature controlling gas is lower than the pressure required in the gas-assisted injection molding method. If appropriate, this mechanism may also be used as a gas injection mechanism for the gas-assisted injection molding method. A piping mechanism for injecting the temperature controlling gas may be provided on the injection molding machine side in the same way as the mechanism for injecting gas into the mold cavity in the gas-assisted injection molding method, separately on the mold side, or on both the injection molding machine side and the mold side.

The mechanism for exhausting the temperature controlling gas can comprise, for example, vents opened to the mold surface and a small number of pipes for collectively exhausting the temperature controlling gas passed through said vents. The diameter of said vents should be within a range of 10 to 300 µm each, should preferably be within a range of 10 to 100 µm each, and more preferably be within a range of 30 to 50 µm each. If this diameter is smaller than 10 µm, the gas volatized from the molten or softened polymer will condense within the vents and more likely to clog the vents, which is not preferable. If the diameter is larger than 300 µm, the molten or softened polymer will enter the vents, the polymer molded product will have irregular surface, which is not preferable, either. The density of said vents should preferably be within a range of 1 to 100 pcs/cm$^2$, and more preferably be within a range of 1 to 80 pcs/cm$^2$, and still more preferably be within a range of 1 to 50 pcs/cm$^2$. If this density is lower than 1 pc/cm$^2$, the temperature controlling gas will not be smoothly exhausted, which is not preferable. If the density is higher than 100 pcs/cm$^2$, the heated air will be exhausted excessively faster, and consequently the mold surface will not be easily set to a desired temperature, which is not preferable, either.

A mechanism for holding the raised temperature of the mold surface can comprise, for example, a skin layer board having said vents and spaces provided at the back of said skin layer board. That is, said mechanism can be realized by heat insulating the skin layer. The spaces provided at the back of said skin layer board fulfill the function of said pipes (i.e., a comparatively small number of pipes for collectively exhausting the temperature controlling gas passed through the vents). This spaces can be obtained by, for example, providing numerous convexes, each of which is islandishly isolated over the surface of the heat insulating board, and supporting the back surface of said skin layer board at the apexes of said numerous convexes. This allows the spaces provide at the back of the skin layer board to fulfill the performance of said pipes. This skin layer may be provided all over the mold surface, but may also be provided only over a portion which should have high transferability.

The skin layer board having said vents should preferably be capable of withstanding the pressure from the polymer side and not easily be degraded in the environment in which the skin layer board is repeatedly exposed to the molten polymer. Therefore, as a material of the skin layer board, nickel, nickel alloy, nickel chrome alloy, chrome alloy, aluminum alloy or austenitic stainless steel is preferable. The thermal conductivity of the heat insulating layer comprising said skin layer board and the spaces provide at the back thereof should be within a range of 0.05 to 0.5 [cal/cm·s·° C.], preferably be within a range of 0.07 to 0.4 [cal/cm·s·° C.], and more preferably be within a range of 0.08 to 0.1 [cal/cm·s·° C.]. If this thermal conductivity is higher than 0.5 [cal/cm·s·° C.], the time required for heating to a desired temperature level will be excessively long, which is not practical. If said heat conductivity is lower than 0.05, cooling will require longer time, and molding cycle will require longer time, which is not practical, either. In order for the surface temperature of said skin layer to be raised to a desired temperature level, the heat capacity of the skin layer should preferably be small. For this purpose, the thickness of said skin layer should be within a range of 10 to 2000 µm, preferably be within a range of 50 to 1000 µm, and more preferably be within a range of 80 to 500 µm.

The preheating of the mold surface can also be achieved by heating the mold surface from the back side.

For example, such preheating can be achieved by adiabatically supporting a member composing the mold surface (hereinafter referred to as "mold surface member") in the state with spaces provided at the back of said mold surface member and injecting and exhausting the temperature controlling gas into and out of said spaces. As an example of such mechanism for supporting said mold surface member in the state with spaces provided at the back of said mold surface member, a mechanism provided with numerous convexes, each of which is islandishly isolated over the surface of the heat insulating board, for supporting the back surface of said mold surface member at the apexes of said numerous convexes is conceivable. Furthermore, a mechanism which is provided with numerous ribs over the back surface of the mold surface member and also over the surface of the heat insulating board, both ribs being arranged in such a positional relationship that both ribs over the back surface of the mold surface member and the ribs over the surface of the heat insulating board intersect each other, for supporting the back of the mold surface member with the heat insulating board, can also be conceivable.

As examples of polymers to which the molding methods according to the present invention can be applied, thermoplastic resins, thermosetting resins, thermoplastic elastomers, natural rubbers and synthetic rubbers can be conceivable.

As examples of these polymers, thermoplastic resins with a plasticizing temperature range of 50 to 450° C. can be used with no particular limit. Specifically, for example, a mixture of one or more polymers, such as styrene resins (e.g., polystyrene, butadiene-styrene copolymer, acrylonitrile-styrene copolymer, acrylonitrile-butadiene-styrene copolymer), ABS resins, AES resins, AAS resins, polyethylene, polypropylene, ethylene-propylene resins, ethylene-ethylacrylate resins, polyvinyl chloride, polyvinylidene chloride, polybutene, polycarbonate, polyacetal, polyphenylene oxide, polymethylmethacrylate, saturated polyester resins (e.g., hydroxycarboxylic acid condensates like polylactic acid, condensates of diol and dicarboxylic acid, such as polybutylene succinate), polyamide resins, fluorocarbon resins, polysulfone, polyether sulfone, polyarylate, polyether ether ketone, and liquid-crystal polymer can be named.

Among these thermoplastic resins, polystyrene, butadiene-styrene copolymer, acrylonitrile-styrene copolymer, ABS resins, AES resins, AAS resins, polyethylene, polypropylene, polyvinyl chloride, saturated polyester resins, and polyamide resins are preferable.

Thermosetting resins can be used with no particular limit. For example, epoxy resins, acrylic resins, urethane resins, epoxy-urethane resins, and acrylic urethane resins can be named.

As examples of thermoplastic elastomers, styrene thermoplastic elastomers (abbreviated as SBCs. Hereinafter abbreviated is indicated in parenthesis), olefine thermoplastic elastomers (TPOs), urethane thermoplastic elastomers (TPUs), ester thermoplastic elastomers (TPEEs), and amide thermoplastic elastomers (TPAEs) according to the classification by hard segment chemical composition can be named. In addition to the above, polyvinyl chloride thermoplastic elastomers (TPVCs), homopolymer type syndiotactic 1,2-polybutadiene, ion cluster type thermoplastic elastomers (ionomers), and fluorinated thermoplastic elastomers containing fluorocarbon resins as arrester blocks can be named. For the information purpose only, of all thermoplastic elastomers composed by means of resin-rubber blending, TPOs with dynamic cross-linking for performance improvement by kneading rubber component, which are used for soft segment, and breaking up dispersed rubber particle size are particularly called "TPVs" in some cases. As such thermoplastic elastomers, a mixture of one or more of these polymers can be named.

As SBCs, styrene-butadiene-styrene block copolymers (SBSs), styrene-isoprene-styrene block copolymers (SISs), styrene-ethylene butylene-styrene block copolymers (SEBSs), functional group applied type SEBSs (f-SEBSs), styrene-ethylene propylene-styrene block copolymers (SEPSs), and random type hydrogen applied styrene butadiene polymers (HSBRs) are preferable.

As TPOs, simply blended type TPO in which polyolefins, such as PP and PE, is mixed with elastomer, such as EP, EPDM, EBM and EBDM, and compounded in a blender, such as Banbury and Labo Plastomill (s-TPO), implanted TPO in which olefin monomer, which is used for hard segment, is copolymerized, and then olefin monomer, which is used for soft segment, is copolymerized in the same plant or in the same reactor (the process flow may be reversed) (i-TPO), and dynamically vulcanized TPO in which rubber is mixed and vulcanized simultaneously in a blender, such as Banbury and Labo Plastomill (TPVs) are preferable. As TPVs, PP-EPDM which is a combination of PP used for hard segment and EPDM used for soft segment (hereinafter, the left part of polymer name refers to hard segment, and the right part of polymer name refers to soft segment), PP-nitrile rubber (NBR), PP-acrylic rubber (ACM), PP-natural rubber (NR), PP-butyl rubber (IIR), PE-EPDM, PE-NR, nylon-NBR, nylon-ACM, polyester-chloroprene (CR), and PVC-NBR are preferable.

As TPUs, TPU in which diisocyanate used for hard segment is toluene diisocyanate, TPU in which diisocyanate used for hard segment is 4,4'-diphenylmethane diisocyanate, TPU in which diisocyanate used for hard segment is 1,6-hexamethylene diisocyanate, TPU in which diisocyanate used for hard segment is 2,2,4(2,4,4)-trimethyl hexamethylene diisocyanate, TPU in which diisocyanate used for hard segment is p-phenylene diisocyanate, TPU in which diisocyanate used for hard segment is 4,4'-dicyclohexylmethane diisocyanate, TPU in which diisocyanate used for hard segment is 3,3'-dimethyldiphenyl-4,4'-diisocyanate, TPU in which diisocyanate used for hard segment is 1,5'-naphthalene diisocyanate, TPU in which diisocyanate used for hard segment is trans-1,4-cyclohexyl diisocyanate, TPU in which diisocyanate used for hard segment is lysine diisocyanate, and mixtures of two or more of these TPUs are preferable.

As TPEEs, polyester-polyether type TPEE in which aromatic crystalline polyester is used for hard segment and polyether is used for soft segment, polyester-polyester type TPEE in which aromatic crystalline polyester is used for hard segment and aliphatic polyester is used for soft segment, and liquid crystalline TPEE in which liquid crystal molecules are used for hard segment and aliphatic polyester is used for soft segment are preferable. As polyester-polyether type TPEEs, either of polycondensate in which butanediol and dimethyl terephthalate, polycondensate in which ethylene glycol and dimethyl terephthalate, polycondensate in which butanediol and 2,6-naphthalene dicarboxylic acid, polycondensate in which ethylene glycol and 2,6-naphthalene dicarboxylic acid, or mixture of these polycondensates are used for hard segment, and polycondensate in which either of polytetramethyleneetherglycol, poly(1,2-poropylene oxid)glycol, poly(ethylene oxid)glycol, or mixture of these glycols is used for soft segment is more preferable. As polyester-polyester type TPEEs, TPEE in which hard segment is the same as polyester-polyether type TPEE but polylactone type aliphatic polyester is used for soft segment is more preferable. As liquid-crystal TPEEs, multi-block copolymer in which thermotropic liquid-crystal polymer, particularly low-molecular liquid-crystal compound, such as dihydroxy-paraquarter-phenyl, is used for hard segment, and aliphatic polyester is used for soft segment is more preferable.

As TPAE, multi-block copolymer in which polyamide is used for hard segment and low-Tg polyether or polyester is used for soft segment is preferable, and copolymer in which nylon-6, nylon-6,6, nylon-6,10, nylon-11 or nylon-12 is used for hard segment and polyetherdiole or polyesterdiol is used for soft segment is more preferable, and copolymer in which at least one of diolpoly(oxytetramethylene)glycol, poly(oxypropylene)glycol, poly(ethyleneadipate)glycol and poly(butylene-1,4-adipate)glycol is used for soft segment is particularly preferable.

As TPVCs, TPVC in which high-molecular weight polyvinyl chloride (PVC) is used for hard segment to give the function of cross-linking point at microcrystalline part, and PVC plasticized with plasticizer is used for soft segment, TPVC in which PVC introduced with partially cross-linked construction or branch construction is used for soft segment and PVC plasticized with plasticizer is used for soft segment, and TPVC in which PVC is used for hard segment and partially cross-linked NBR or similar rubber and/or TPE, such as TPU and TPEE, is used for soft segment, or mixture of two or more of these TPVC are preferable.

Natural rubbers can be used with no particular limit. For example, one of gum Arabic, karaya rubber or the like or mixture of two or more of these natural rubbers can be named.

Synthetic rubbers can be used with no particular limit. For example, polybutadiene rubber, polyisoprene rubber, isobutylene-isoprene rubber, ethylene-α-olefin-(diene) copolymer (e.g., EPM, EBM, EOM, EPDM, EBDM), aromatic-vinyl-compound-conjugate-compound-(α-olefin) copolymer (e.g., SBR, SBS, SEBS), acrylonitrile-butadiene rubber, fluorocarbon rubber, silicone rubber, butyl rubber halide (e.g., butyl rubber chloride, butyl rubber bromide), and mixture of two or more of these synthetic rubbers can be named.

The above-described thermoplastic resins, thermosetting resins, thermoplastic elastomers, natural rubbers and synthetic rubbers can be used in a form of alone or multi-mixture.

As far as it does not impair the objects of the present invention, the above-described polymers can be blended with a cross-linking agent, a vulcanization acceleration aid, a vulcanization activator, a filler, an anti-oxidant, a processing aid, a softener, a lubricant, a light stabilizer, an antibacterial agent, and other additives.

The foaming agent used in the molding methods according to the present invention varies according to the type of the polymer to be used as a molding material. For example, a well-known inorganic or organic foaming agent can be used. As specific examples of the foaming agent, sodium bicarbonate, ammonium bicarbonate, sodium carbonate, ammonium carbonate, azodicarboxylic amide, dinitrosopentamethylene tetramine, dinitrosotelephthalic amide, azobisisobutyronitrile, azodicarboxylic barium, and sulfonyl hydrazides such as toluenesulfonyl hydrazide can be named.

Among of all, azodicarboxylic amide, dinitrosopentamethylene tetramine, and sulfonyl hydrazides are more preferable.

These foaming agents may be used in combination with a well-known foaming aid for urea, urea derivatives or the like.

The blending ratio of the foaming agent varies depending on the type of the polymer as a molding material and the use of the molded product. For example, 100 parts by weight of polymer, 0.5 to 30 parts by weight of the foaming agent is preferable, and 1 to 15 parts by weight of the foaming agent is more preferable. If the foaming agent is used too little, foam with only a low expansion ratio could be obtained, and if 30 or more parts by weight of the foaming agent is used, gas generated by the decomposition of the foaming agent might be excessive, abnormally raising gas pressure and resulting in foam with cracks.

As examples of the uses of molded products molded by the molding methods according to the present invention, stationery products (e.g., desk mats, cutting mats), car interiors or exteriors (e.g., interior panels, assist grips, instrumental panel skin materials, bumper materials), civil engineering materials (e.g., facing films, waterproof mats), shoes materials (e.g., shoe soles), sports goods (e.g., head gear, shoulder pads), semiconductor-related parts, medical materials, food-related materials, office automation equipment-related parts, audio visual and household electrical appliance parts and office equipment parts can be named.

BRIEF DESCRIPTION OF DRAWINGS

FIG. 1(a) illustrates a case where a gas injection pipe 51 is provided in the same position as a molten resin injection nozzle 41, and FIG. 1(b) illustrates a case where the gas injection pipe is used also as a gas exhaust pipe;

FIG. 3(a) illustrates a process in which gas is injected at the same time when molten resin is injected, and FIG. 3(b) illustrates a process in which gas is exhausted and thereby the inside of molten resin is foamed;

FIG. 6(a) illustrates a case where a gas injection pipe 51 is provided in the same position as a molten resin injection nozzle 41, and FIG. 6(b) illustrates a case where the gas injection pipe is also used as a gas exhaust pipe, where both cases have heat insulating layers 15 and 25;

PREFERRED EMBODIMENTS

Figure 1:
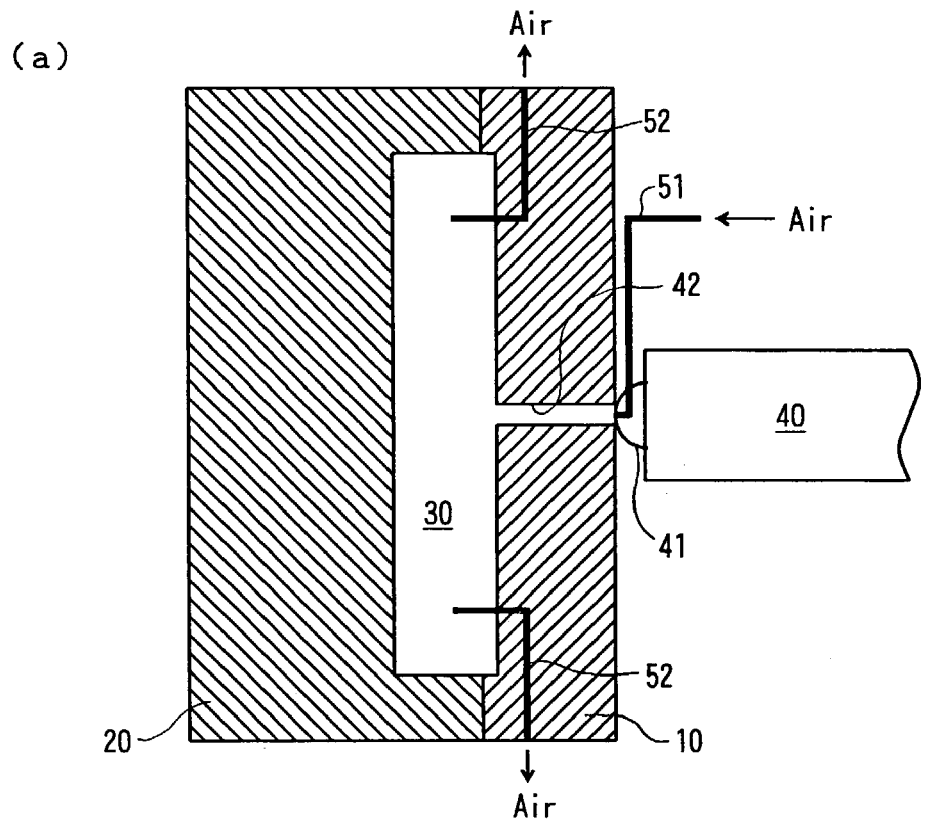
FIG. 1 is a schematic view illustrating the cross section of molds used for the injection molding method of the first preferred embodiment according to the present invention, where
Figure 1:
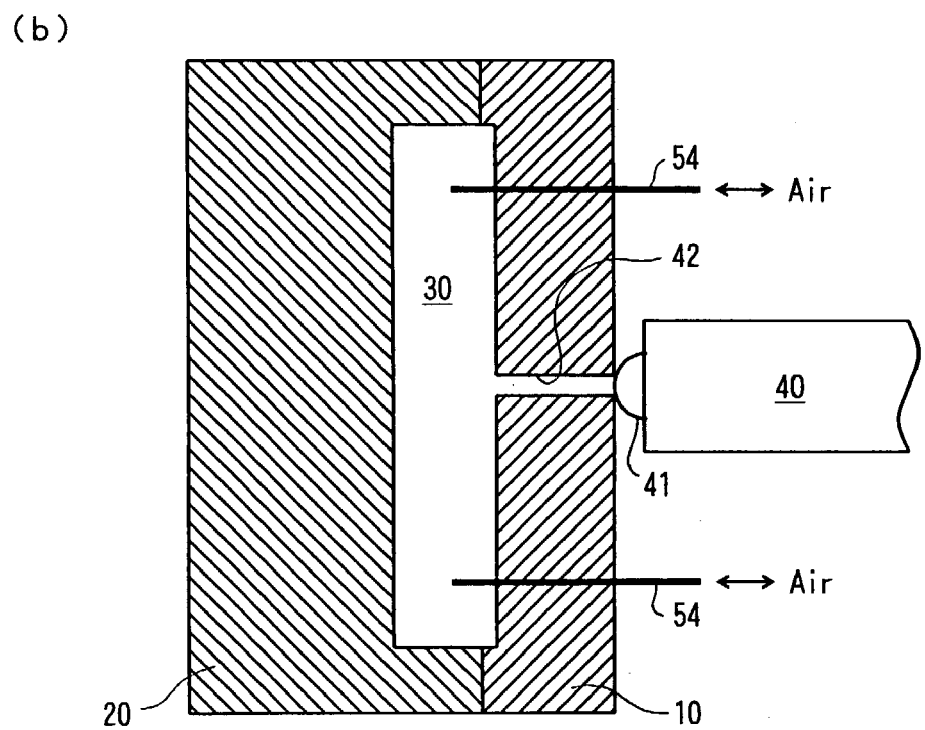

Hereinafter, preferred embodiments according to the present invention will be described referring to the drawings.

(1) First Preferred Embodiment

Figure 2:
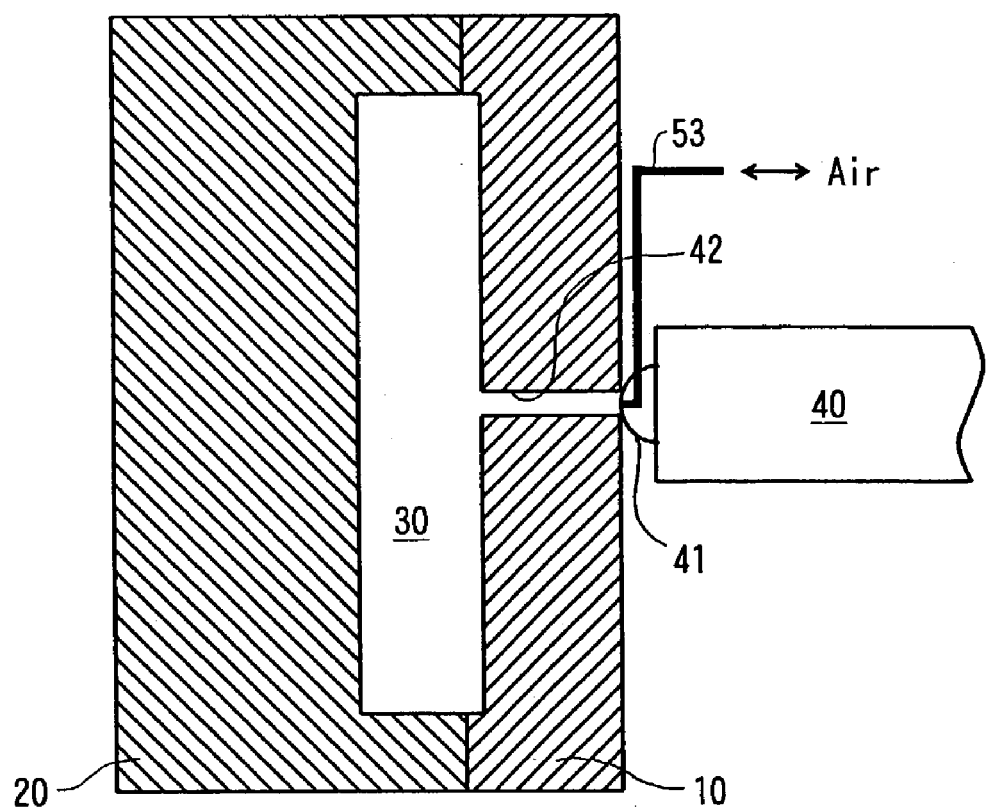
FIG. 2 is a schematic view illustrating the cross section of a mold used for the injection molding method of the first preferred embodiment according to the present invention, and illustrating a case where a gas injection pipe is used also as a gas exhaust pipe and provided in the same position as a molten resin injection nozzle 41.

FIG. 1(a), (b), and FIG. 2 are schematic views illustrating the cross section of molds used for the injection molding method of the first preferred embodiment according to the present invention. FIG. 1(a) illustrates a structure in which a gas injection pipe 51 is provided in the same position as a molten resin injection nozzle 41. FIG. 1(b) illustrates a structure in which a pipe 54 is used both as a gas injection pipe and as a gas exhaust pipe. FIG. 2 illustrates a structure in which a pipe 53 is used both as a gas injection pipe and as a gas exhaust pipe and provided in the same position as a molten resin injection nozzle 41.

According to the structure illustrated in FIG. 1(a), molten polymer is injected through an injection molding nozzle 41 of an injection machine 40 into a cavity (in-mold space) 30 formed by an upper mold 10 and a lower mold 20, and at the same time, high-pressure gas (air) is injected through a gas injection pipe 51 provided in the same position as the injection molding nozzle 41 into the molten polymer.

Figure 3:
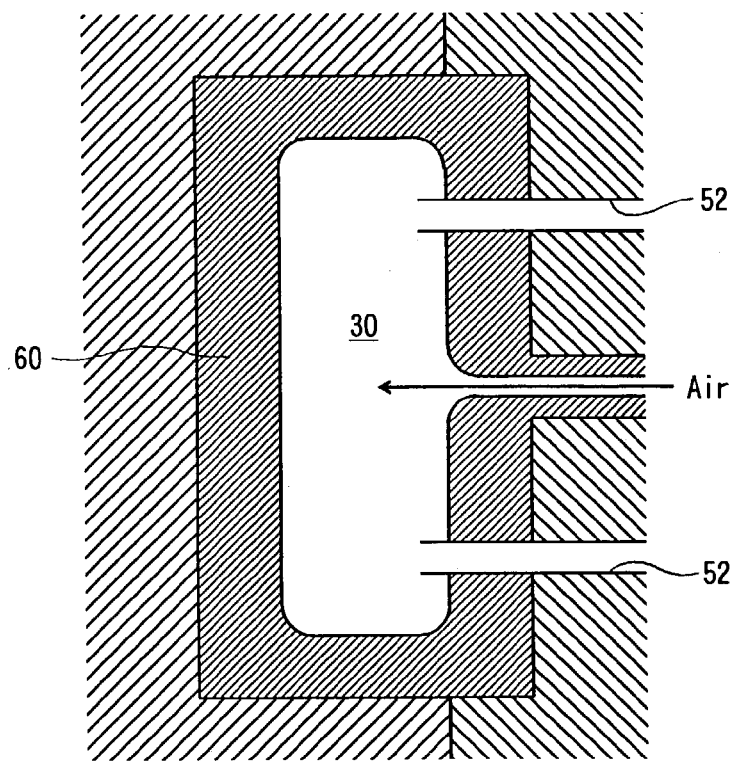
FIG. 3 is a descriptive view illustrating an injection molding process performed with the mold of FIG. 1(a), where
Figure 3:
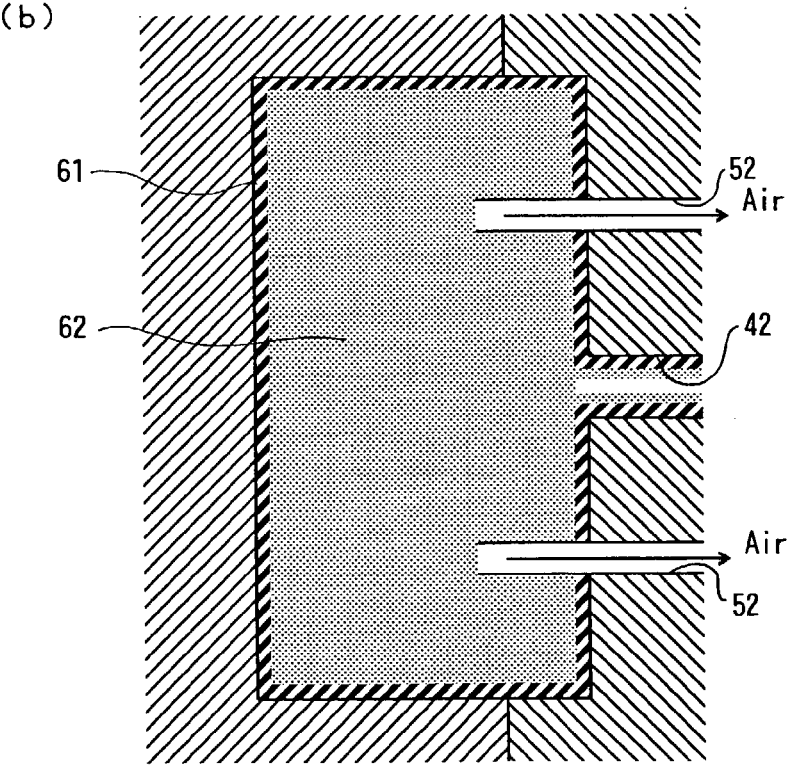
Figure 4:
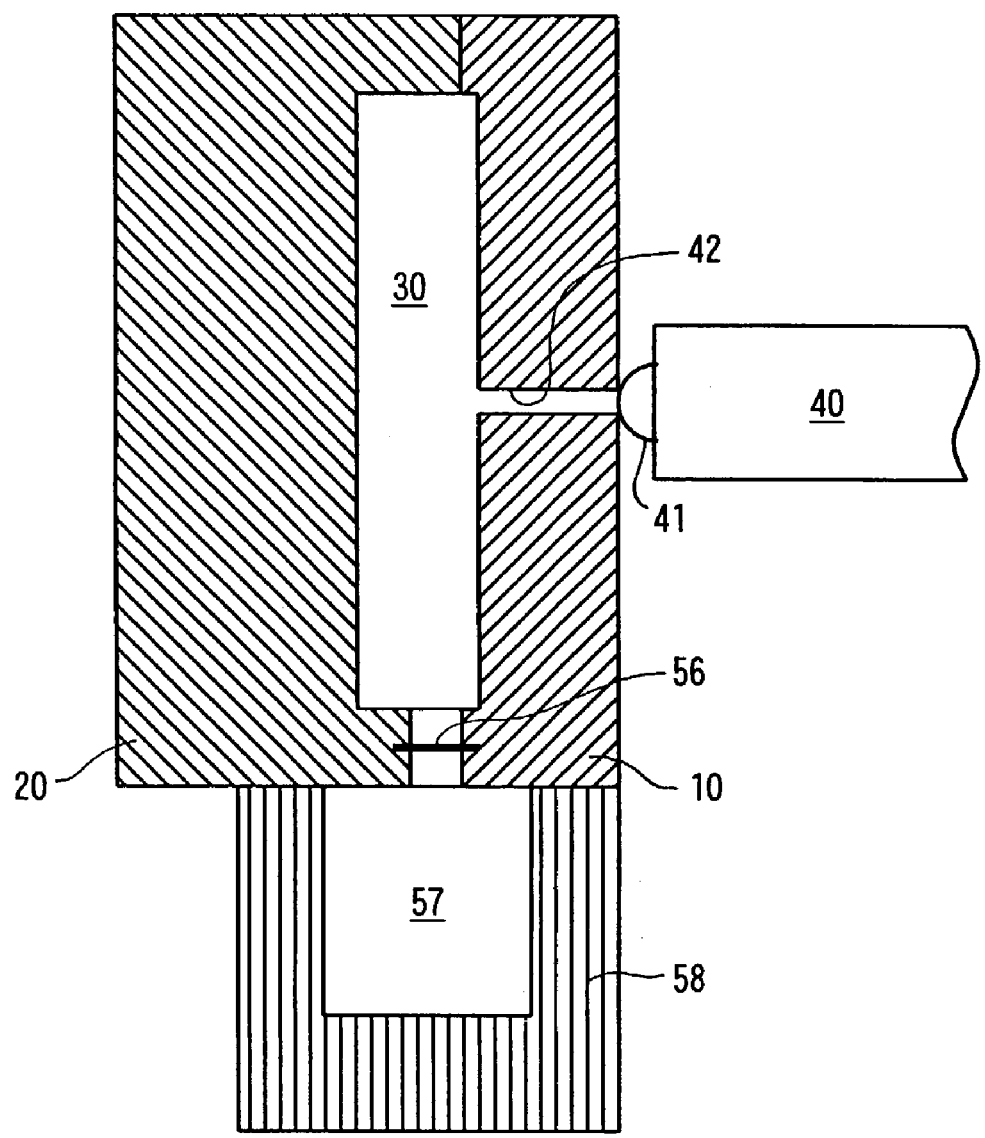
FIG. 4 is a schematic view of the cross section of a mold used for the injection molding method of the second preferred embodiment according to the present invention, where a difference from FIG. 1 lies in that molten resin is released into a shelter 57.
Figure 5:
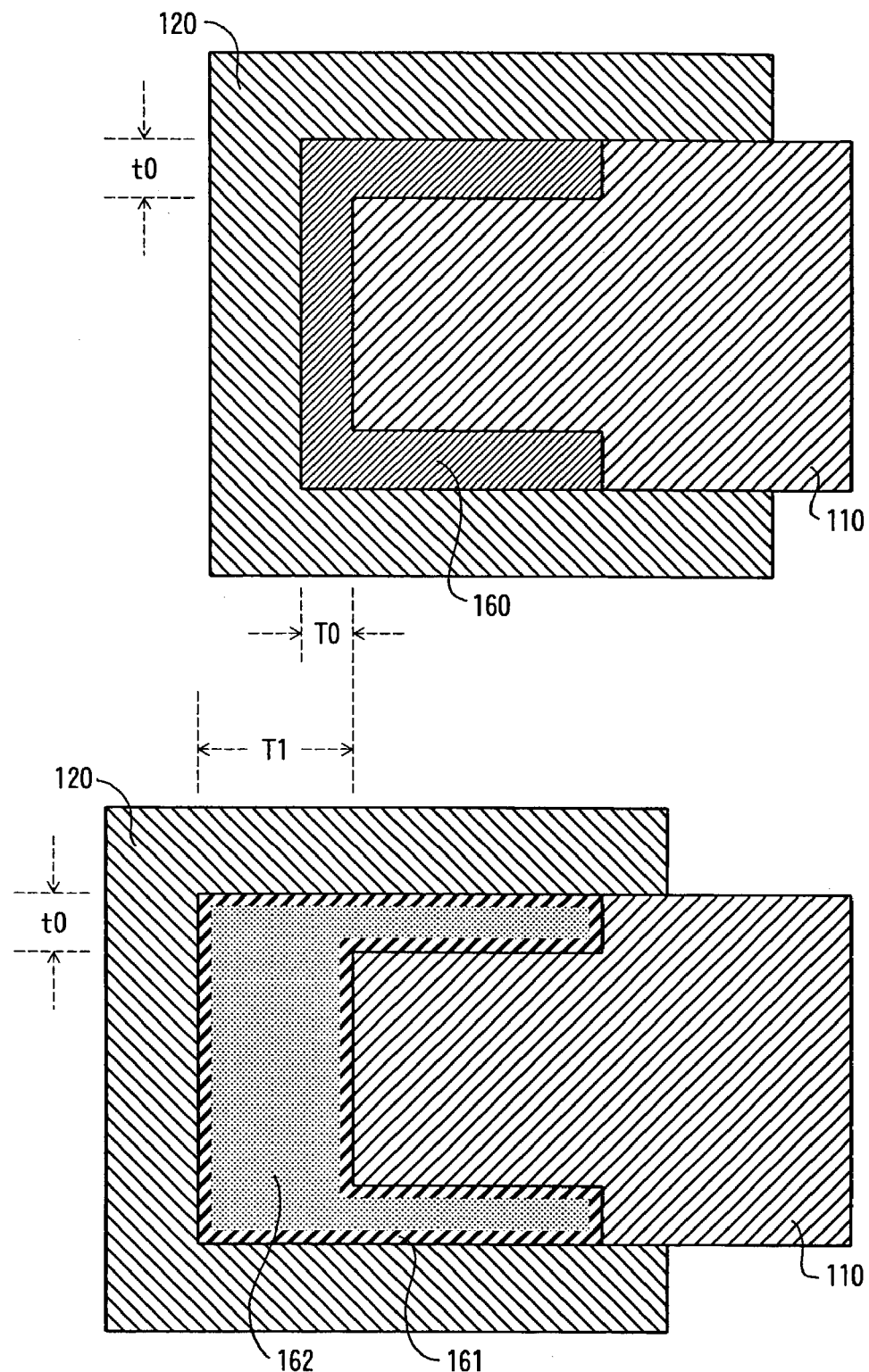
FIG. 5 is a descriptive view of the operation of a mold used for a conventional injection molding method, and illustrating a process in which molten resin is injected and then a lower mold 120 is displaced and thereby the cavity space is enlarged.

The distribution of molten polymer 60 at this time is illustrated in FIG. 3(a). As illustrated in this figure, the molten polymer 60 is in adhesion to the whole area of the mold surface.

The pressure of gas in injection is properly set according to the type of molten polymer, injection pressure, mold surface temperature, volume and shape of the cavity 30 and others.

The gas is exhausted through a gas exhaust pipe 52 with timing in which the skin layer of the molten polymer injected in the manner as described above is cooled and solidified. The gas may be exhausted by making the gas exhaust pipe 52 communicated with the outside (i.e., by not placing the exhaust pressure of the gas under positive control but by having the gas is pushed out by the foaming pressure of the molten polymer), or alternatively it may be so arranged that a valve mechanism or the like is incorporated in the gas exhaust pipe 52 so that the pressure within a cavity 30 (i.e., the internal pressure of the molten polymer) can undergo a transition according to a desired pressure pattern, and thereby the exhaust gas pressure can be regulated. Here, the desired pressure pattern refers to a pressure pattern set so that the inside of a molded product can be foamed with a desired expansion ratio, and the abscissa axis is taken as time axis.

The volume occupied by the molten polymer increases and the pressure decreases as the gas exhaust develops, and therefore the molten polymer foams. A condition in which a molded product comprising a skin layer 61 and an internal foamed layer 62 has been molded is illustrated in FIG. 3(b).

The above description uses the structure illustrated in FIG. 1(a). When the structure illustrated in FIG. 1(b) is used, injection molding is made in the same way as the above but with a difference that a pipe 54 is used both for gas injection and for gas exhaust. Also, when the structure illustrated in FIG. 2 is used, injection molding is made in the same way as the above but with a difference that a pipe 53 is used both for gas injection and for gas exhaust and the pipe 53 is provide in the same position as a molten resin injection nozzle 41.

(2) Second Preferred Embodiment

FIG. 2 is a schematic view illustrating the cross section of a mold used for the injection molding method of the second preferred embodiment according to the present invention. According to the second preferred embodiment, a part of molten polymer injected into a cavity 30 is released into a shelter 57, and thereby the volume occupied by the molten polymer is increased, the pressure is decreased, and the inside thereof is foamed.

Timing with which a part of the molten polymer is released into the shelter 57 is timing with which the skin layer (portion contacted close to the mold cavity surface) of the molten polymer injected into the cavity 30 is cooled and solidified. When this timing comes, a shutter 56 is opened, and a part of the molten polymer within the cavity 30 is released into the shelter 57.

Here, the shutter may be omitted by properly setting the volume of the cavity 30, the volume of the shelter 57, the diameter of a passage communicating between the cavity 30 and the shelter 57 and others. That is, when the skin layer of the injected molten polymer is quickly formed, a part of the molten polymer can be released into the shelter from the very start of the injection of the molten polymer. In this case, as there is no need to control the open/close operation of the shutter, the molding process control can be simplified this much.

(3) Third Preferred Embodiment

Figure 6:
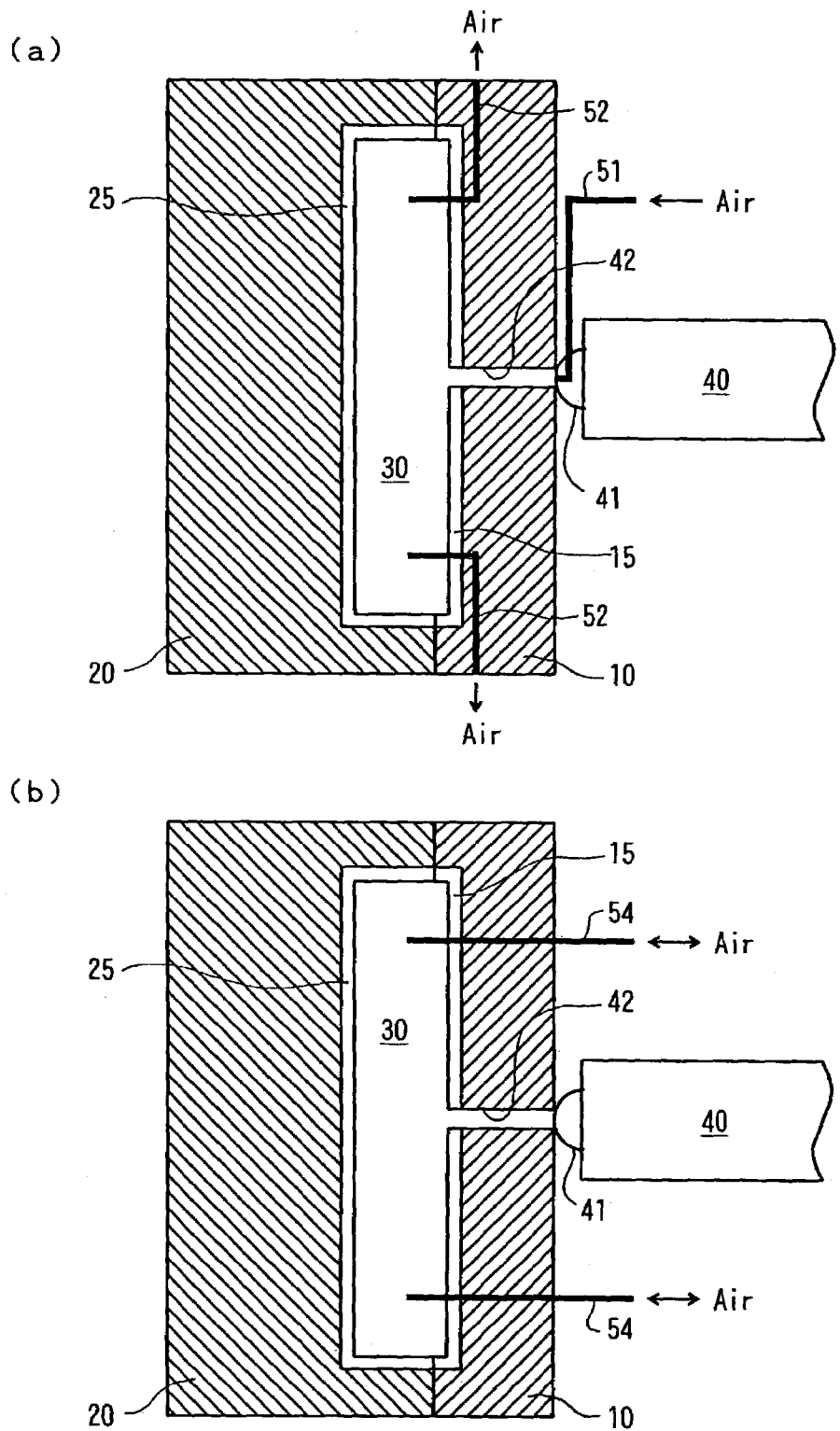
FIG. 6 is a schematic view of the cross sections of a mold used for the injection molding method of the third preferred embodiment according to the present invention, where

FIG. 6(a) and FIG. 6(b) are schematic views of the cross section of molds used for the injection molding method of the third preferred embodiment according to the present invention. Each of the molds of FIG. 6(a) and FIG. 6(b) is roughly the same as each of the molds of FIG. (a) and FIG. 1(b) according to the first preferred embodiment. A difference there between lies in that each of the molds of FIGS. 1(a) and 1(b) has no heat insulating layer while each of the molds of FIG. 6(a) and FIG. 6(b) has heat insulating layers (a heat insulating layer 15 of an upper mold 10, and a heat insulating layer 25 of a lower mold 20). Due to the provision of these heat insulating layers, each of the molds of FIG. 6(a) and FIG. 6(b) has higher transferability than each of the molds of FIG. 1(a) and FIG. 1(b) has, provided that all other conditions are the same.

(4) Fourth Preferred Embodiment

Figure 7:
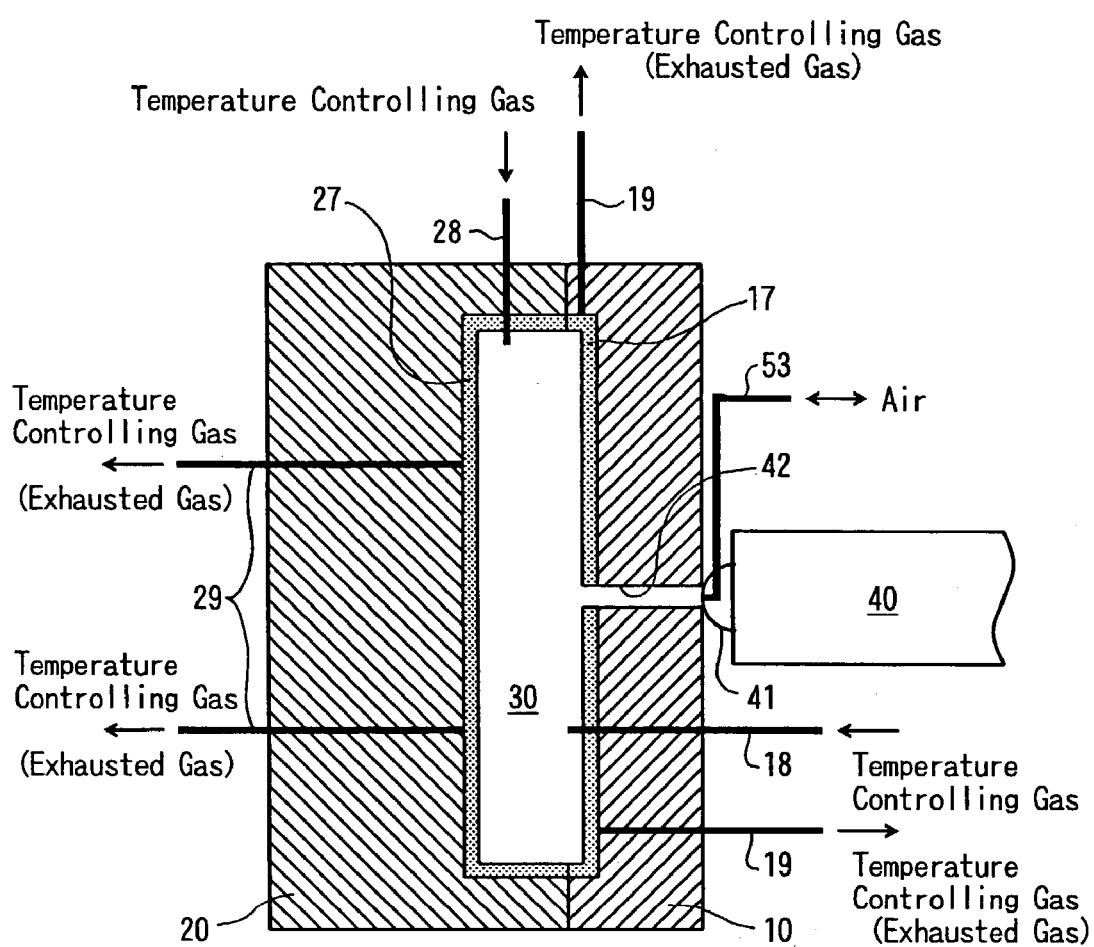
FIG. 7 is a schematic view of a mold used for the injection molding method of the fourth preferred embodiment according to the present invention, illustrating a case where a gas injection pipe is used also as a gas exhaust pipe and provided in the same position as a molten resin injection nozzle 41, where said case has temperature control gas injection pipes 18 and 28, temperature control gas exhaust pipes 19 and 29 and mold surface members 17 and 27.
Figure 8:
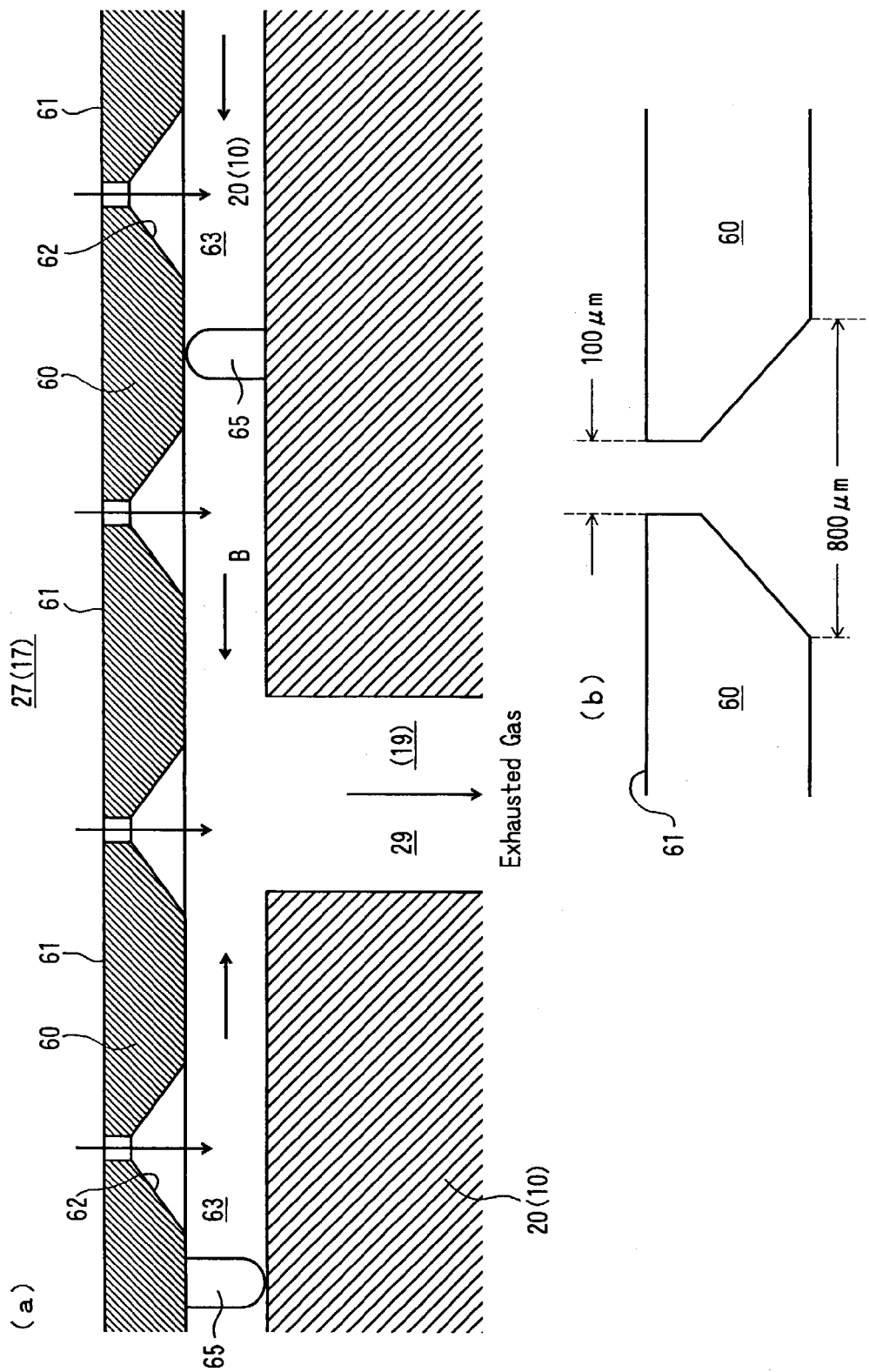
FIG. 8 is a detailed view illustrating the cross section of the mold surface member 17 (27) of FIG. 7.

FIG. 7 is a schematic view of a mold used for the injection molding method of the fourth preferred embodiment according to the present invention, and FIG. 8 is a detailed view of the cross section of a mold surface member 17 (27) of FIG. 7. The mold surface member 17 (27) is provided with gas both exhausting function and heat insulating function.

The mold illustrated in FIG. 7 is roughly the same as the mold of FIG. 2 according to the first preferred embodiment. Differences therebetween lie in that the mold of FIG. 2 has no temperature controlling gas injection mechanism while the mold of FIG. 7 has a temperature controlling gas injection mechanism (injection pipes 18 and 28) and that the mold surface of the mold of FIG. 2 is formed as a surface of the mold body while the mold surface of the mold of FIG. 7 is formed with the mold surface members 17 and 27 having temperature controlling gas passing and exhausting functions and temperature holding function by means of heat insulation.

When the mold of FIG. 7 is used, heated gas is injected into a cavity 30 through gas injection pipes 18 and 28 before the molten polymer is injected into a cavity 30. Thereby, the molding surfaces of the mold surface members 17 and 27 (i.e., surfaces exposed to the cavity 30) are heated to a desired temperature level. On the other hand, the heated gas injected into the cavity 30 is exhausted to the outside through spaces 63 (FIG. 8) and through gas exhaust pipes 19 and 29. For this arrangement, the mold of FIG. 7 has higher transferability that the mold of FIG. 2 has, provided that all other conditions are the same.

Finally, the mold surface member 27 of the lower mold 20 will be described referring to FIG. 8. Here, it should be noted that the mold surface member 17 of the upper mold 10 is also structured in the same way. The mold surface member 27 of the lower mold 20 comprises a skin layer board 60 of 500 μm thick made of nickel and a numerous projections 65 islandishly isolated from each other all over the back surface of said skin layer board 60. These projections 65 are to provide spaces 63 between the skin layer board 60 and the surface of the lower mold 20. According to this preferred embodiment, spaces of 200 μm high or so each are provided. Alternatively, these projections 65 maybe provided over the surface of the lower mold 20, or over both the back surface of the skin layer board 60 and the surface of the lower mold 20 (unless both projections are not coincided with each other). The skin layer board 60 with a surface 61 serving as a mold surface is provided with numerous vents 62. The diameters of these vents 62 are 100 μm or so each on the side of the cavity 30 and 800 μm or so each on the side of the spaces 63. These vents 62 are communicated with a gas exhaust pipe 29 provided within the lower mold 20 through the spaces 63, and the other end of said gas exhaust pipe 29 is communicated to the outside.

EXAMPLES

Working examples molded by using the molding methods according to the present invention will be described.

Thermoplastic elastomer: Sixty-eight parts by weight of ethylene-propylene-5-ethylidenenorbornen copolymerized rubber (manufacturer: JSR Corporation; product name: "EP98A;" ethylene contents: 79 mol %; propylene contents: 21 mol %; iodization: 15; paraffinic oil: 75 phr oil extension), 10 parts by weight of linear low-density polyethylene (LLDPE) (manufacturer: Japan Polychem Corp.; product name: "UF423"), 17 parts by weight of hydrogenated diene copolymer (Manufacturer: JSR Corporation; a trade name: "DYNARON DR6200P"), 5 parts by weight of propylene-ethylene block polymer (manufacturer: Japan Polychem Co., Ltd.; product name: "BC5CW") as crystalline-α-olefin copolymer, and 0.2 parts by weight of anti-oxidant (manufacturer: Chiba Specialty Co., Ltd.; product name: "Irganox 1010") were weighed, hot-kneaded in a 10-liter pressure kneader (manufacturer: Moriyama Seisakusho Co., Ltd.) at a preset temperature of 150° C. for 15 minutes at a rotational speed of 32 rpm (the former half of the kneading) and 28 rpm (the latter half of the kneading). The obtained composition in the molten state was pelletized, and thus the aimed thermoplastic elastomer was obtained.

Foaming agent: Manufacturer: Eiwa Chemical Ind. Co., Ltd., Product name: Foaming Agent Master Batch Elastoren EE206.

By using 95 parts by weight of this thermoplastic elastomer and 5 parts by weight of Elastoren EE206, the following products were molded:

Example 1

According to the First Preferred Embodiment

The above-described pellet-blended thermoplastic elastomer and foaming agent were pellet-blended and mold-injected and gas was injected at the same time, and then the gas was slowly exhausted. As a result, a molded product with adequate appearance and feel and the foamed inside was obtained.

Example 2

According to the Second Preferred Embodiment

The above-described pellet-blended thermoplastic elastomer and foaming agent were pellet-blended and mold-injected, and after the mold cavity was filled with the molten polymer, the shutter was opened to increase the volume of the molten polymer. As a result, a molded product with adequate appearance and feel and the foamed inside was obtained.

The invention claimed is:

1. A method for molding a polymer comprising the steps of, putting a polymer containing a foaming agent into a mold cavity while contacting the polymer in a molten state close to the surface of the mold cavity, communicating the mold cavity with a shelter to release a part of the polymer to the shelter by foaming pressure and increase a volume to be occupied by the polymer while maintaining the inside shape of the mold cavity, and obtaining a molded product having an outside shape thereof fit to the inside shape of the mold cavity and the inside thereof made foamed, wherein the mold cavity is communicated with the shelter by opening a shutter provided in a passage between the mold cavity and the shelter.

2. A method for molding a polymer according to claim 1, wherein the entirety or a part of the surface of the mold cavity is heat insulated by providing spaces at the back of the surface and/or composing the surface with a porous metal.

3. A method for molding a polymer according to claim 1, wherein the mold cavity is communicated with the shelter by a passage having a predetermined diameter.

4. A method for molding a polymer comprising the steps of, putting a polymer containing a foaming agent into a mold cavity being communicated with a shelter, contacting the polymer in a molten state close to the surface of the mold cavity to cool and solidify a surface portion, and form a skin layer while releasing a part of the polymer to the communicated shelter to increase a volume to be occupied by the polymer while maintaining the inside shape of the mold cavity, and obtaining a molded product having an outside shape thereof fit to the inside shape of the mold cavity and the inside thereof made foamed, wherein the mold cavity is communicated with the shelter by opening a shutter provided in a passage between the mold cavity and the shelter.

5. A method for molding a polymer according to claim 4, wherein the entirety or a part of the surface of the mold cavity is heat insulated by providing spaces at the back of the surface and/or composing the surface with a porous metal.

6. A method for molding a polymer according to claim 4, wherein the mold cavity is communicated with the shelter by a passage having a predetermined diameter.

* * * * *